United States Patent
Valliath et al.

(10) Patent No.: US 7,106,358 B2
(45) Date of Patent: Sep. 12, 2006

(54) METHOD, SYSTEM AND APPARATUS FOR TELEPRESENCE COMMUNICATIONS

(75) Inventors: George T. Valliath, Buffalo Grove, IL (US); Kevin W. Jelley, LaGrange, IL (US)

(73) Assignee: Motorola, Inc., Schaumburg, IL (US)

(*) Notice: Subject to any disclaimer, the term of this patent is extended or adjusted under 35 U.S.C. 154(b) by 567 days.

(21) Appl. No.: 10/331,697

(22) Filed: Dec. 30, 2002

(65) Prior Publication Data

US 2004/0130614 A1 Jul. 8, 2004

(51) Int. Cl.
 *H04N 7/14* (2006.01)

(52) U.S. Cl. ............... 348/14.08; 348/14.01; 348/14.16; 709/204; 345/753

(58) Field of Classification Search ... 348/14.01–14.16; 709/204; 345/753, 750, 757
 See application file for complete search history.

(56) References Cited

U.S. PATENT DOCUMENTS

| 4,400,724 | A | * | 8/1983 | Fields | 348/14.1 |
| 6,313,864 | B1 | * | 11/2001 | Tabata et al. | 348/14.02 |
| 6,466,250 | B1 | * | 10/2002 | Hein et al. | 348/14.16 |
| 6,583,808 | B1 | * | 6/2003 | Boulanger et al. | 348/14.09 |

* cited by examiner

Primary Examiner—Wing F. Chan

(57) ABSTRACT

An apparatus, system and method for telepresence communications at a virtual location between two or more participants at multiple locations (100, 200). First perspective data descriptive of the perspective of the virtual location environment experienced by a first participant at a first location and feature data extracted from features of a second participant at a second location (210, 220) are processed to generate a first virtual representation of the second participant in the virtual environment from the perspective of the first participant (250). Likewise, second perspective data descriptive of the perspective of the virtual location environment experienced by the second participant and feature data extracted from features of the first participant (230, 240) are processed to generate a second virtual representation of the first participant in the virtual environment from the perspective of the second participant (260). The first and second virtual representations are rendered and then displayed to the first and second participants, respectively (260, 270). The first and second virtual representations are updated and redisplayed to the participants upon a change in one or more of the perspective data and extracted feature data from which they are generated (290, 295). The apparatus, system and method are scalable to two or more participants.

69 Claims, 10 Drawing Sheets

METHOD, SYSTEM AND APPARATUS FOR TELEPRESENCE COMMUNICATIONS

TECHNICAL FIELD

This invention relates to interpersonal communication using audio-visual technology and more specifically to methods and systems for the transmission and reception of audio-visual information.

BACKGROUND OF THE INVENTION

There are many situations in which one or more individuals would like to observe and possibly interact with objects or other individuals. When two or more individuals need to meet and discuss issues of mutual interest, a common approach is a physical (face-to-face) meeting. This type of meeting has the advantage of direct personal contact and gives the individuals the ability to communicate most effectively, since eye contact may be maintained, and physical gestures such as facial expressions, hand movements, and body posture are readily evident. For most meetings, this is the preferred medium of exchange since large amounts of information may be exchanged transparently if the information is at the location of the meeting.

In certain situations, such as communication over long distances, arranging such face-to-face meetings can be time-consuming or prohibitively expensive. In these situations, the most common way to exchange information is over the telephone, via e-mail or by teleconferencing. Each of these approaches has serious drawbacks. Telephone conversations provide none of the visual cues that may be important when making a business decision. Telephone conversations are also difficult to manage when more than two individuals need to be involved in the meeting. E-mail or regular postal services are much slower than an in-person meeting and provide none of the visual or even audio cues that are present in in-person meetings. The use of video teleconferencing equipment allows individuals at remote locations to meet and exchange information through the use of audio/visual communication.

There is, however, a substantial difference between an in-person meeting between two or more people and a meeting using a video teleconferencing system. The latter does not provide the same experience as the former. In an in-person meeting, we see the other person in three dimensions, in color and at the right size. More importantly, we have the ability to make and maintain eye contact. This visual information contributes to a sense of presence of the individual. The current state of the art in video teleconferencing provides none of these benefits. Video teleconferencing also does not provide the nuances of facial and body movement available from a personal meeting, since the entire image is transmitted at the same scale. Therefore, the in-person impact of a frown or smile is likely to be greater than when using a video teleconferencing system since the correct aspect and detail of the area around the mouth is not transmitted in a video teleconference. Moreover, exchange of non-personal information, such as reports, documents, etc., resident at a particular location to others participating in a teleconference may be limited. It is therefore difficult to transmit personal and non-personal information of a desirable quality and quantity using existing teleconferencing technology.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
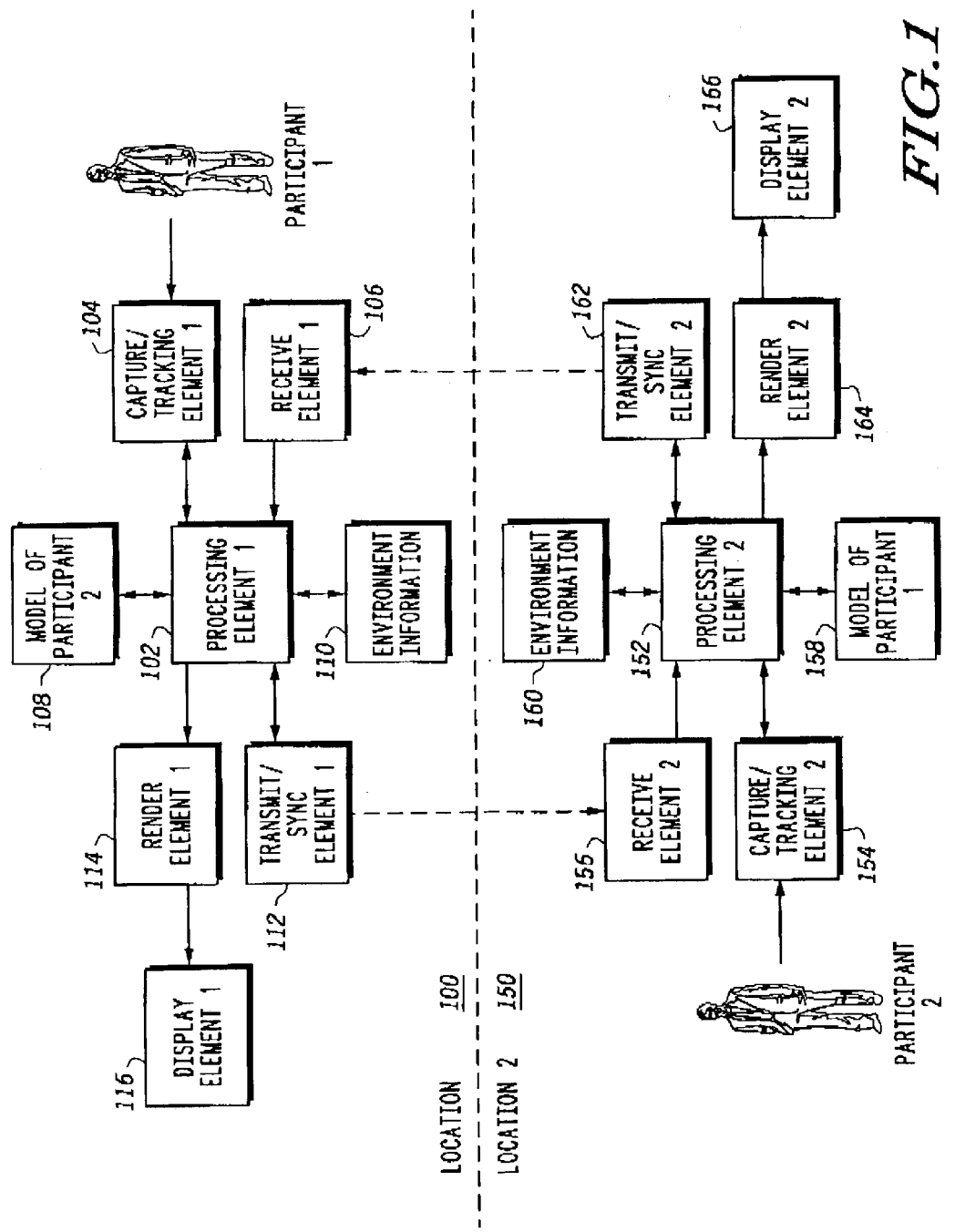
FIG. 1 is a block diagram of a system that supports virtual teleconferencing, in accordance with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a block diagram of a system that supports a virtual teleconference at a virtual location between a first participant at a first location 100 and a second participant at a second location 200 is shown. The system provides for the collection, processing and display of audio-visual information concerning one or more remotely located participants to a local participant in a manner that has telepresence, as will be described. The collection and processing of audiovisual information from both remote participants and a local participant, as well as interaction between remote and local participants and environment data of the virtual location, allows for the generation, updating and display of one or more virtual representations or avatars of remote participants in the environment of the virtual location of the teleconference to be made to the local participant, from the perspective of the local participant. The telepresence teleconferencing of the present invention is scalable to any number of participants. The functionality shown in FIG. 1 may be employed for each participant beyond Participant 1 and Participant 2 that is added to the virtual teleconference, subject to available memory and latency requirements, with stored model information about the added participants made available to each of the other participants in the teleconference to facilitate the generation of virtual representations or avatars of all remote participants in the teleconference to any given local participant.

There is a capture/tracking element 104, 204, respectively, that captures cued data generated by features of the participants 1, 2. As used herein, cued data refers to data generated by certain monitored features of a participant, such as the mouth, eyes, face, etc., that provide information that enhances the sense of actual presence, referred to as telepresence, experienced by participants in the virtual location of the teleconference. Cued data may be visual and/or audio. Cued visual data refers to the capture of the movement of such features may be cued by movement of the feature, such as movement of an eyebrow, the mouth, a blink, etc., or it may be cued to automatically update periodically. Cued data may have an audio component as well and capture of cued audio data may be triggered by the sound produced by a participant's mouth or movement of the mouth itself. Additional cued visual data to be collected may be movement of the hands, the head, the torso, legs, etc. of a participant. Gestures, such as head nods, hand movement, and facial expressions, are important to clarify or enhance meaning, generally augmenting the communication experience and thus are important to enhance the telepresence of the present invention. The capture elements 104, 204 additionally may have the ability to track movement of certain of the features they are monitoring, as will be explained. Suitable capture elements may include cameras, microphones, and head tracking equipment. Any number of capture elements may be used. For instance, there may be a camera devoted to capturing and tracking movement of each eye of a participant, another devoted to capturing facial movements, such as mouth movement, and a microphone for capturing any sounds uttered by the participant. Moreover, the proximity of the data capturing devices to the participant who movements and sounds are being captured may vary. In a head mounted display, the eye, face, mouth, head tracking, etc. capture elements may be located inside the eyewear of the head mounted display. Or, the capture elements may be a series of cameras located on a desk, table or other area proximate the participant.

One mechanism that incorporates the data capture components into a single integrated system is a specially designed pair of eyeglasses. The eyeglasses are capable of collecting eye and facial tracking information, as well as audio information through the use of a boom, a collection device that may have a single point of attachment to a head-mounted data capture element.

The cued data gathered from a participant is processed by a processing element 102, 104 to extract recognized and selected feature data, such as pupil movement, eyebrow movement, mouth movement, etc., from the raw cued data captured by the capture elements 104, 204. This extracted feature data of the local participant may then be transmitted by transmit elements 112, 162 for receipt by processors associated with remote participants, where it will be used, along with other data, such as environment and perspective data, to generate a virtual representation of the local participant in the virtual environment for viewing by one or more remote participants from the perspective of the remote participants.

In addition to capturing cued visual data from a participant, the capture elements 104, 204 additionally are tasked with capturing perspective data from the participant 1, 2, respectively. It is noted that perspective data may be captured by capture elements that are different or disjoint from capture elements 102, 204. Perspective data refers to any orientation or movement of the participant being monitored that may affect what is experienced by the participant in the virtual environment of the teleconference. Perspective data may thus include movement of the head or a re-orientation, such as turning, of the participant's body. For instance, if the virtual environment of the teleconference is to provide the sense that participants 1 and 2 are seated across from each other at a virtual conference table, then the act of participant 1 moving his head, standing up, leaning forward towards participant 2, etc. may each be expected to change what is seen or heard by participant 1 in the virtual environment, and thus the perspective of the environment of the virtual location experienced by participant 1 is said to have changed. Capturing and tracking movement, re-orientation, or other perspective data of a participant provides one of the types of data that is used to process and generate a believable teleconference at the virtual location for the participant. Suitable capturing/tracking elements for capturing perspective data may include cameras or other motion tracking elements such as magnetometers that use the magnetic field of the earth and accelerometers that measure acceleration, or other devices used to determine the direction and orientation of movement of the head or other parts of the body that can affect the perspective of the virtual environment that is experienced by a participant.

Data about the one or more participants at remote locations is additionally needed to generate a virtual representation of the remote participants in the virtual environment from the perspective of a local participant. Receive elements 106, 206, functionally associated with participants 1 and 2, respectively, receive cued visual data captured from one or more remote participants and transmitted over the system by remote transmit elements 112, 162 as described above. Thus, for the simplified system of FIG. 1, receive element1 106 will receive from transmit element 162 extracted feature data extracted and processed by processing element2 152 from cued visual data captured by capture/tracking element2 154 from Participant 2 and transmitted by transmit element2 156. Similarly, receive element2 156 will receive from transmit element1 112 extracted feature data extracted and processed by processing element1 102 from cued visual data captured by capture/tracking element1 104 from Participant 1 and transmitted by transmit element1 112. Again, the system of FIG. 1 is scalable, meaning there may be more than two participants, in which case the extracted feature data received by receive elements 106, 156 would be from more two or more remote participants.

With the receipt of extracted, remote feature data by the receive element associated with a participant, the local processing element now has enough information to generate one or more virtual representations of the one or more remote participants in the virtual environment from the local participant's perspective. In addition to the extracted feature data of a remote participant received by the local receive element, the processing element associated with the local participant has the perspective data captured from the local participant, a model of the remote participant, and information that defines what the visual and audio configuration of the environment of the virtual location at which the virtual teleconference takes place. The processing element thus processes this information to generate a virtual representation of the remote participant in the virtual environment as seen from the perspective of the local participant. This processing may be performed by the processing element to generate virtual representations from the perspective of the local participant in the virtual environment for each remote participant that transmits its visual and/or audio information to the local receiver element.

Visual extracted feature data of the remote participant may be put together with a model of the remote participant (108, 158) that is stored and accessible to the processing element associated with the local participant. The stored model may be a two-dimensional or three-dimensional (3D) computer model upon which the received extracted feature data may be used to update the model. The model may additionally be just the head, bust or some larger model of the remote participant. It may be that only head or face portion of the model is individual to the remote participant, with the rest of the virtual representation of the remote participant being supplied by a stock avatar. The portion of the virtual representation of the remote participant that is individualized by the use of the participant-specific model 108, 158 may well be affected by factors such as the amount and quality of cued data that is collected and the amount of processing power and time to be dedicated to this task. If only eye, mouth, and face data are captured from the remote participant, then it would sufficient to store only a participant-specific model of the head of the remote participant upon which the collected and extracted feature data may be overlaid, for example. An example of a 3D model is described in conjunction with FIG. 9.

Information about the environment 110, 160 of the virtual location where the teleconference is to take place is also processed by the local processing element when generating the virtual representation of a remote participant. Environment data expresses the set-up of the virtual conference, with the relative positions of each of the participants in it and the visual backdrop, such as the location of conference table, windows, furniture, etc. to be experienced by the participants. Movement of a participant, by either head or body movement, by one or more teleconference participants may change the perspective from which the participant sees this environment and so must be tracked and accounted for when generating the virtual representation of the remote participant that will be displayed to the local participant. Again, the processing element that generates the virtual representation for the local participant is operable to generate virtual representations in this manner for each participant in the virtual teleconference for which cued data is received.

Figure 3:
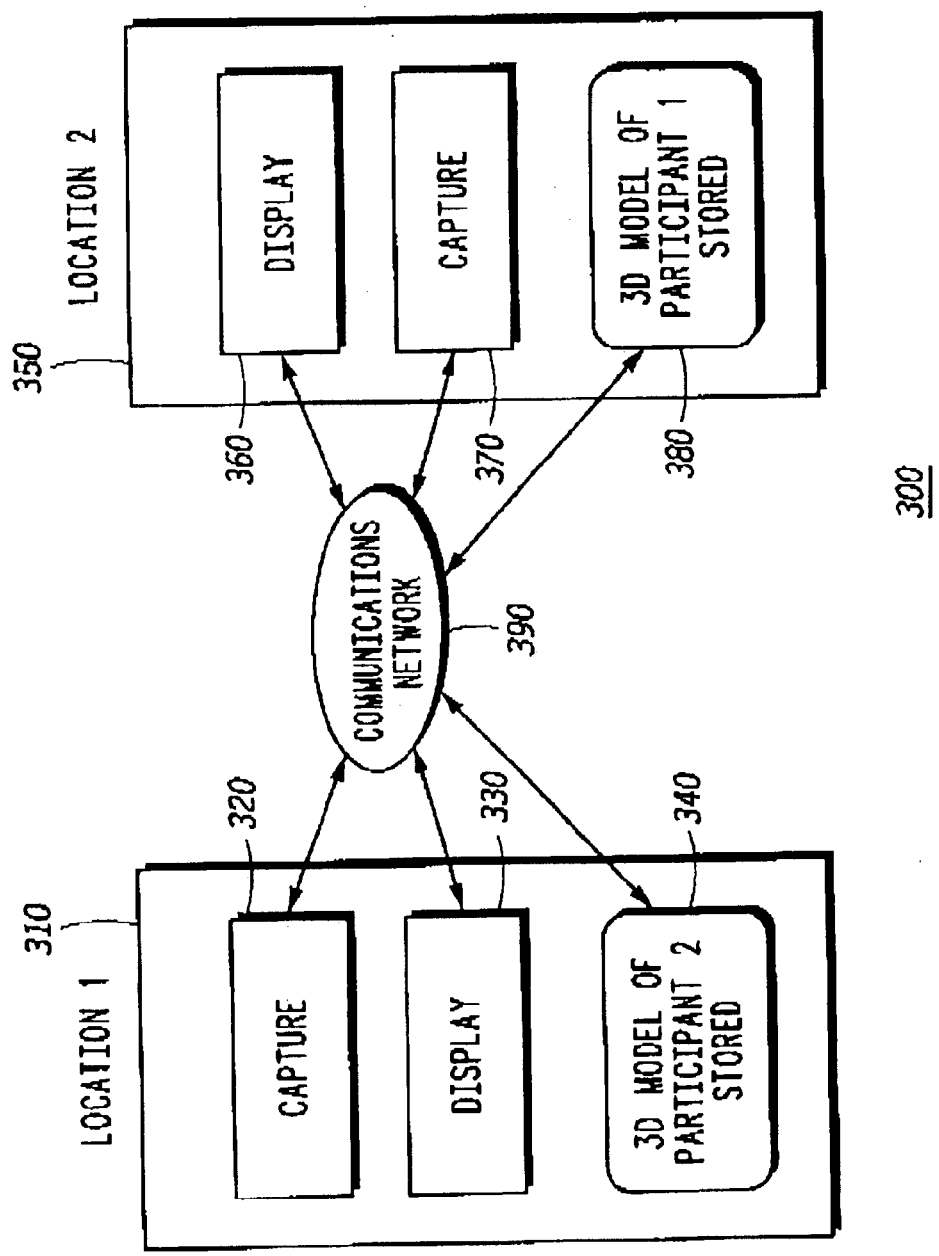
FIG. 3 is a block diagram of virtual teleconferencing, in accordance with certain embodiments of the present invention.

The processing elements 1 and 2, shown as elements 102 and 152, respectively, need not necessarily reside at the participants' locations. Additionally, they need not necessarily be one discrete processor and may indeed encompass many processing elements to perform the various processing functions as will be described. It is further envisioned that there may be a central processing element, which would encompass both processing element1 102 and processing element2 152 and which may further be physically located in a location different from locations 100 and 200. This is illustrated in block diagram 300 of FIG. 3 in which the processing of captured local feature and perspective data and remote data need not be performed at local locations, such as Location 1 and Location 2, and may indeed be provided by processing capabilities of communication network 390. The captured data of participants 1 and 2 are is transmitted remotely using communications network 390. In a certain embodiment of the present invention, communications network 390 is a high bandwidth, low latency communications network. For instance, data may be communicated at 20 fps with a 150 mS latency over a standard Internet IP link.

Models of remote participants 340, 380 are shown at local locations, but this is not required, particularly as the processing element or elements are to be located on the communication network; the stored model may be a 3D computer model as shown. 3D models are useful to store image information that does not rapidly change, and thereby allows the amount of data that must be transmitted across communications network 390 to be reduced. After receiving remote image data, data display components 330 and 360 are operable to update the 3-dimensional models 340 and 380 used to create the virtual representation.

The one or more virtual representations that have been generated in the virtual environment by the processing element are provided to a render element 114, 164 that renders the computer generated data of the one or more virtual representations for display by a display element 116, 166 to the local participant. The display element may be part of a head mounted display worn by the local participant or it may be any other suitable mechanisms for displaying the environment of the virtual location to the participant.

Important to maintaining the sense of actual presence or telepresence between two or more participants in the teleconference, the system has the ability to monitor or track any changes occurring with remote participants or the local participant. Any such changes will require that the virtual representation of the virtual environment and the other participants in it be changed accordingly. Thus, upon a change in the remote cued data received by a local receiver element, the perspective data collected from a local participant, or a change in the environment of the virtual location itself, will cause the one or more virtual representations of remote participants that are generated to be updated and the updated representations rendered and then displayed to the local participant.

Figure 2:
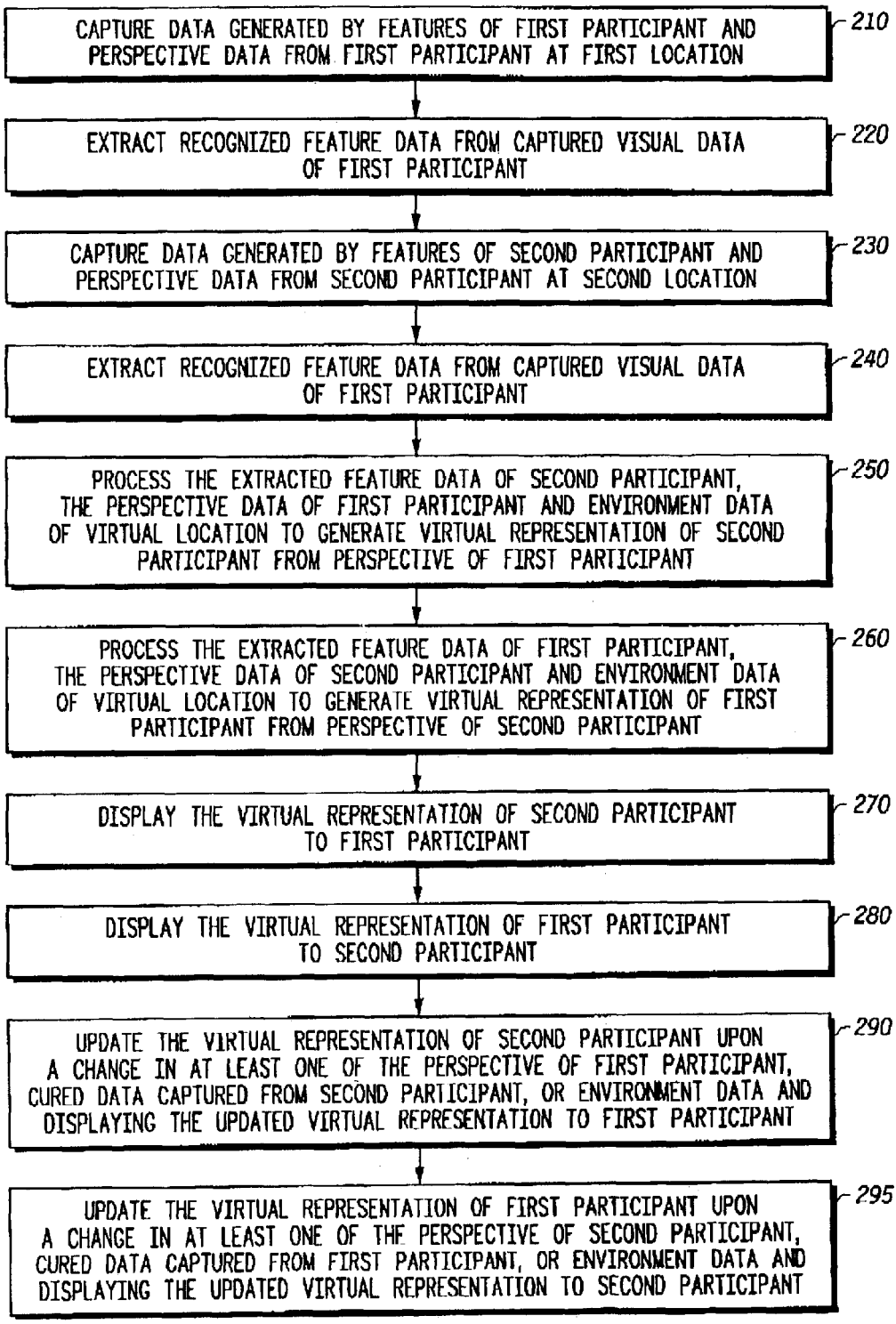
FIG. 2 is a flow describing virtual teleconferencing, in accordance with certain embodiments of the present invention.

Referring now to FIG. 2, a flow chart 200 which described a method of teleconferencing between at least two participants at a virtual location in accordance with certain embodiments of the present invention is shown. At block 210, data generated by the features of first participant 100 and perspective data of first participant 100 are captured. At Block 220, recognized patterns of the captured feature data of the first participant 100 are extracted. At Blocks 230 and 240, capturing of perspective data and cued data of the second participant 200 and extraction of recognized data is performed. At Block 250, the extracted feature data of the second participant, the perspective data of the first participant, and environment data of the virtual location are processed to generate a virtual representation of the second participant from the perspective of the first participant. At Block 260, similar processing occurs to generate a virtual representation of the first participant from the perspective of the second participant. These virtual representations may then be displayed to the appropriate participant at Blocks 270 and 280. As described above, the virtual representation is first rendered by a rendering element and the rendered virtual representation is displayed to the participant on an appropriate display means, such as a head mounted display. Finally, at Blocks 290 and 295, the generated virtual representations are updated upon a change in any of the data used to generate them. Thus, a change in the perspective data of the local participant, the cued data captured from the remote participant, or the environment will ensure that the virtual representation is updated accordingly. It is important to note, however, that since the cued remote data and the local perspective data are being monitored and tracked continuously, the virtual representations are being updated periodically anyway, such 15 times or more per Second, for instance. However, a change in the data may force the update process to occur sooner than it might otherwise have occurred, contributing to the sense of a "real-time" in-person telepresence environment enjoyed by participants in the virtual teleconference.

It is noted here that while the capture, extraction and processing necessary to create the virtual representation of the second participant for display to the first participant occurs prior to similar processing to generate the virtual representation of the first participant for display to the second participant, the order may be changed if so desired without departing from the spirit and scope of the invention.

Figure 4:
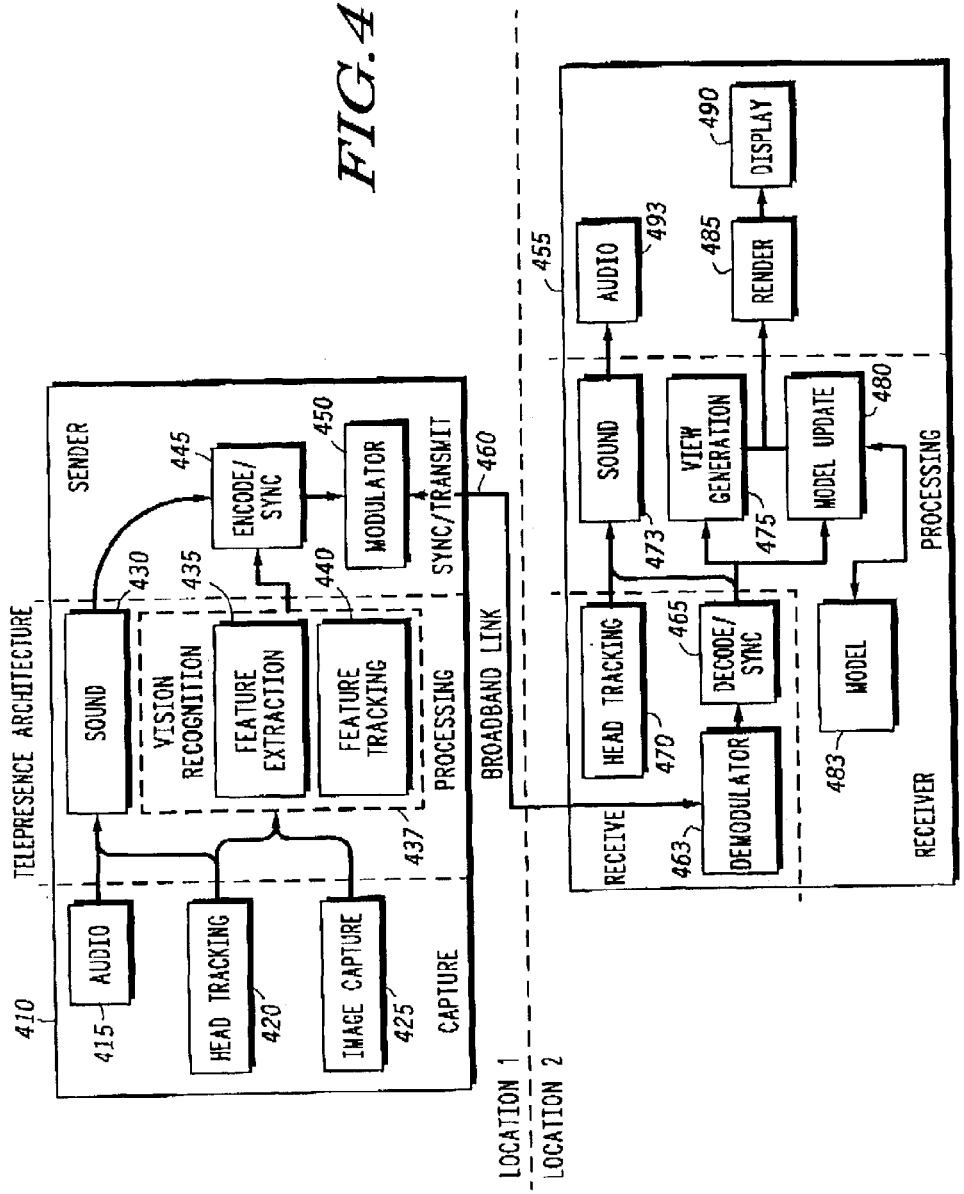
FIG. 4 is a exemplary, more detailed block diagram of system that supports virtual teleconferencing, in accordance with certain embodiments of the present invention.

Referring now to FIG. 4, a more detailed block diagram 400 of elements of telepresence communication architecture 400 is shown, in accordance with certain embodiments of the present invention. As indicated by the dashed line in the figure, the figure illustrates functionality involving data collected between first and second locations. As will be clear from the following description, the functionality concerns data collected, processed and transmitted by a sender block 410 at location 1 and data received, processed and displayed by a receiver block 455 at location 2. However, it will be understood that to make a completely integrated system there will need to be a receiver block and a sender block to support the participant at location 1 and the participant at location 2. The one-directional block diagram of FIG. 4 will simplify the description to follow and an extension to a fully bi- or multi-directional will be understood by those of skill in the art. It will be noted by one of ordinary skill in the art that a telepresence communication system is operable to transmit two images in full duplex using one or more broadband links. Thus, a remote location may comprise a sending module 410 as well as a receiving module 455. Also, a local location may comprise a sending module 410 and a receiving module 455. This configuration will allow two images to be tracked, transmitted, received and displayed. This is of course scalable to any number of locations and participants, subject to available processing power, storage, and latency conditions.

It can be seen by means of the dashed lines in the figure, that there are three main functions being performed by sender block 410 for the participant at Location 1: capture/tracking, processing, and synchronizing/transmitting. The sender block 410 is concerned primarily with the capture/tracking at Blocks 415, 420, 425, processing at blocks 430 and 437, and transmitting at Blocks 445, 450 of locally obtained participant information. At block 415, local audio, such as what the location 1 participant is saying is captured. Head tracking block 420 tracks movement and orientation of the location 1 participant and thus supplies the perspective data of participant 1. Image Capture block 425 captures feature data of location 1 participant, such as movement of participant 1's mouth, eyes, face, etc. In more sophisticated capture schemes, other features of the participant may be captured, such as movement of hands, arms, legs, etc. Blocks 415, 520, 425 are all examples of capture elements 104, 154. In certain embodiments of the present invention, audio element 415 is a microphone or boom microphone, head tracking element 420 is a head tracker, accelerator or some combination thereof. An MPEG-4 style facial animation player with local head tracking for a space-stable view may be used if desired. Image capture element 425 may be a number of cameras.

Figure 5:
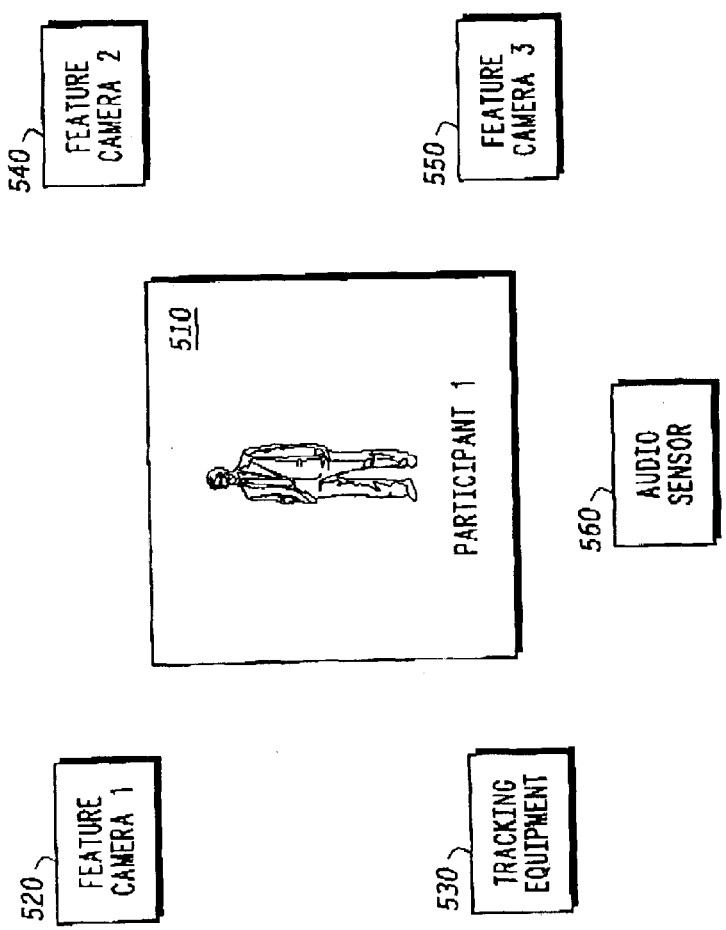
FIG. 5 illustrates various types of capture elements, in accordance with certain embodiments of the present invention

FIG. 5 illustrates various types of capture elements suitable for capturing and tracking cued feature data and perspective data of a participant. In this figure, features of participant 510, such as eyes, mouth, face, hands, head etc. are captured by feature cameras 520, 550, and 550, while tracking equipment 530 is operable to track movement of these features. Audio sensor 560 captures audio generated by participant 510. Additionally, mouth movements may be tracked via audio analysis and embedded camera or cameras in a boom microphone if desired. According to an embodiment of the present invention, one or more of feature cameras 520, 540, 550, tracking equipment 530 and audio sensor 560 may be located in a head mounted display, such as an eyewear display. Also according to an embodiment of the present invention, a boom having one or more boom cameras and an audio sensor 560 may be coupled to the pair of eyeglasses. The one or more boom cameras are operable to provide more detailed resolution of the mouth and the region around the mouth. In a certain embodiment of the present invention, infrared illumination could be employed by eye cameras to compensate for lack of visual light.

Processing is performed on the audio information and the perspective data captured by head tracking element 420 to generate sound information about the location 1 participant that can be transmitted. Sound processing block 430 can modify the raw audio 415 produced by Participant 1 as a function of the head movement of Participant 1. Alternately, the raw audio captured at 415 may be simply transmitted if no locale processing is needed or desired. Computer vision recognition element 437 has feature extraction 435 and feature tracking 440 processing of the head tracking and cued feature data provided by elements 420 and 425. The most important feature data contained in the captured data is extracted and will be transmitted for processing by the receiver 455 at a remote location 2. Computer vision recognition subsystem 437, for instance, can extract and track movements of the head, mouth, pupils, eyelids, eyebrows, forehead, and other features of interest. In some cases, computer vision recognition element 437 may use a local 3D model of the participant itself for feature tracking.

In accordance with certain embodiments of the present invention, a sense of eye-to-eye contact may be achieved by providing, during a transmission set-up period, a first one or more fixed dots on the image displayed to a first user and a second one or more fixed dots on the image displayed to a second user. During the transmission set-up period, the location of the eyes in the image displayed to the first participant is collocated with the first one or more fixed dots. Also during the transmission set-up period, the location of the eyes in the image displayed to the second participant is collocated with the second one or more fixed dots. This approach enables the participants to have the sense of eye-to-eye contact since the first one or more fixed dots and the second one or more fixed dots provide the expected location of the eyes displayed to the first participant and the second participant, respectively. Eye contact is maintained by the participants responding to the visual cues presented to them, as in a real-life in-person conversation.

Extracted feature data from block 437 and processed sound from block 430 is encoded and synchronized at block 445. It is modulated at modulator 450 and then transmitted for receipt by demodulator 463 of the receiver block 455 associated with Location 2. In a certain embodiment of the present invention, this data is transmitted using a broadband link 460.

Data received from location 1 by demodulator 463 is demodulated and passed to a decoder 465. Decoder 465 passes decoded audio and extracted feature data of the participant at location 1 to sound element 473, view generation block 475 and model update block 480. Movement and orientation of participant 2, referred to as perspective data of participant 2, from head tracking element 470 and the audio data received from participant 1 are processed by sound block 473 to generate an audio component of a virtual representation of participant 1 from the perspective of participant 2 that can then be provided by audio element 493. Consider, for example, the following. The audio component of the virtual representation made available to participant 2 is affected not only by what participant 1 says, but also upon the orientation of participant 2's body or head with respect to participant 2 in the virtual environment.

In certain embodiments of the present invention, encoder 445 encodes spatial coordinated information that enables head tracking component 470 to create an aspect of the remote image that is space stabilized. Note that this space stabilization is operable to occur when one or more aspects captured by head tracking equipment 420 and image capture equipment 425 are coupled to a pair of eyeglasses. In this case, the use of head tracking 420 and feature tracking 440 allows the 3-D image generated to be stabilized with respect to movement of the head.

Extracted feature data is additionally made available to view generation block 475 and model update block 480 by decoder 465. It is used by model update 480 to update the model of the participant at location 1 that is stored at block 483. In certain embodiments, model update block 480 performs a facial model update that uses facial data stored in 3-D model 483 to construct the virtual representation of participant 1. View generation block 475 generates the view or views of the virtual representation of the participant 1 from the perspective of participant 2 to be rendered by render element 485 and then displayed to the participant at location 2 by display 490. In certain embodiments of the present invention, two slightly different views of the virtual representation of participant 1 in the virtual environment are generated by view generation element 475. When these slightly different views are rendered and then displayed to each eye at 485 and 490, respectively, they result in participant 2 experiencing a 3D stereoscopic view of participant 1.

Figure 6:
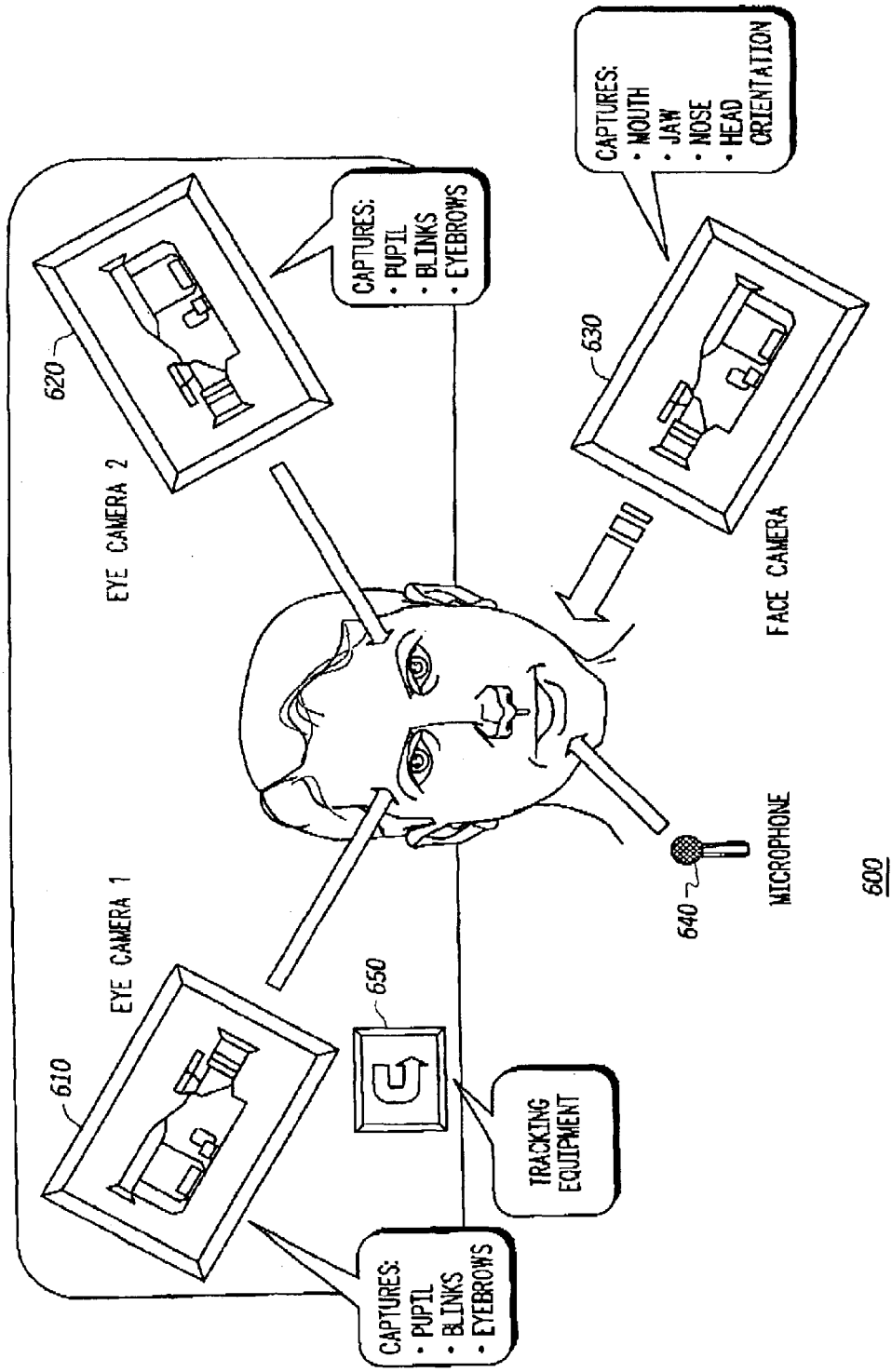
FIG. 6 illustrates an exemplary data capture system, in accordance with certain embodiments of the present invention
Figure 7:
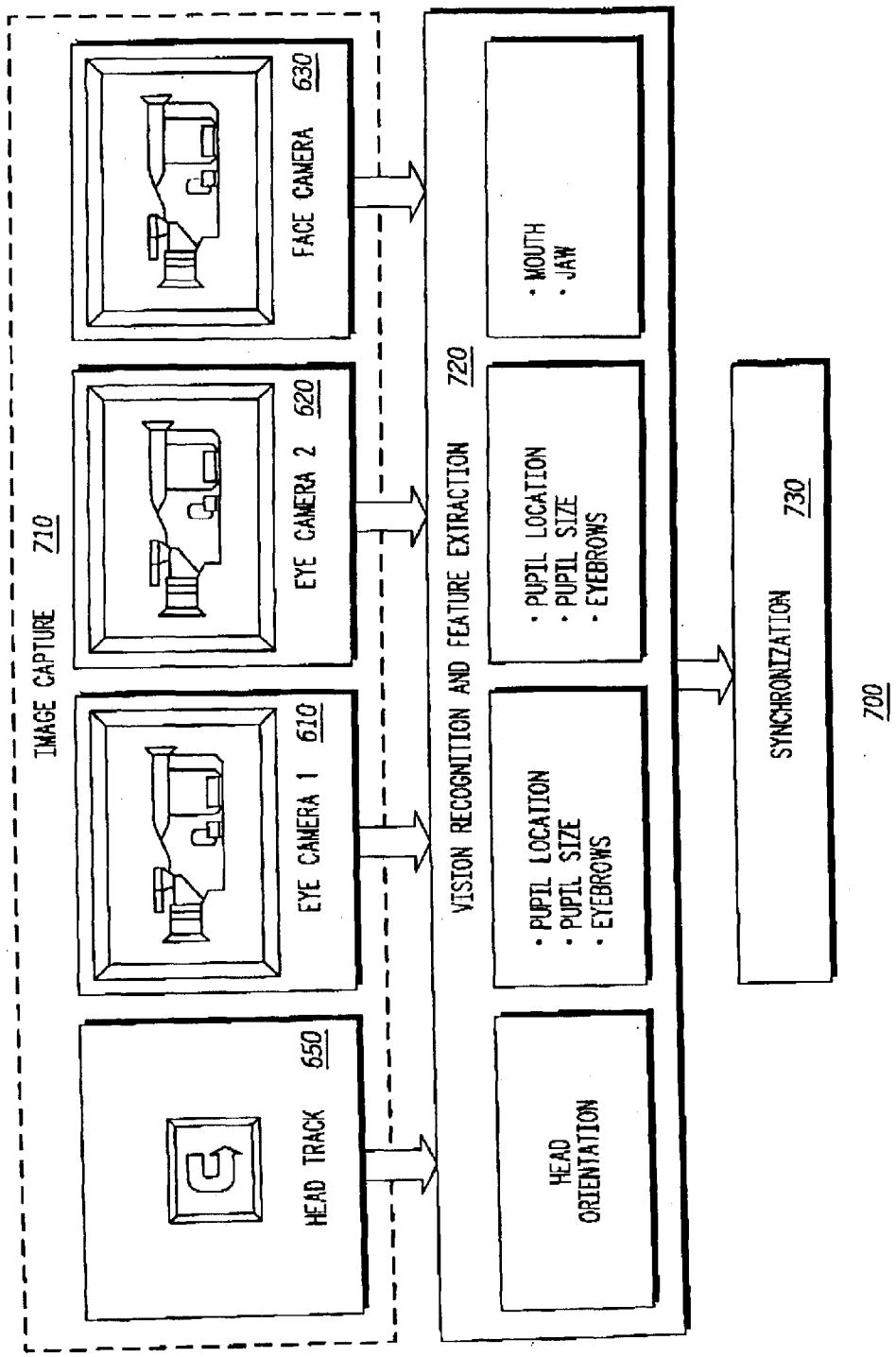
FIG. 7 illustrates an image capture flow, in accordance with certain embodiments of the present invention
Figure 8:
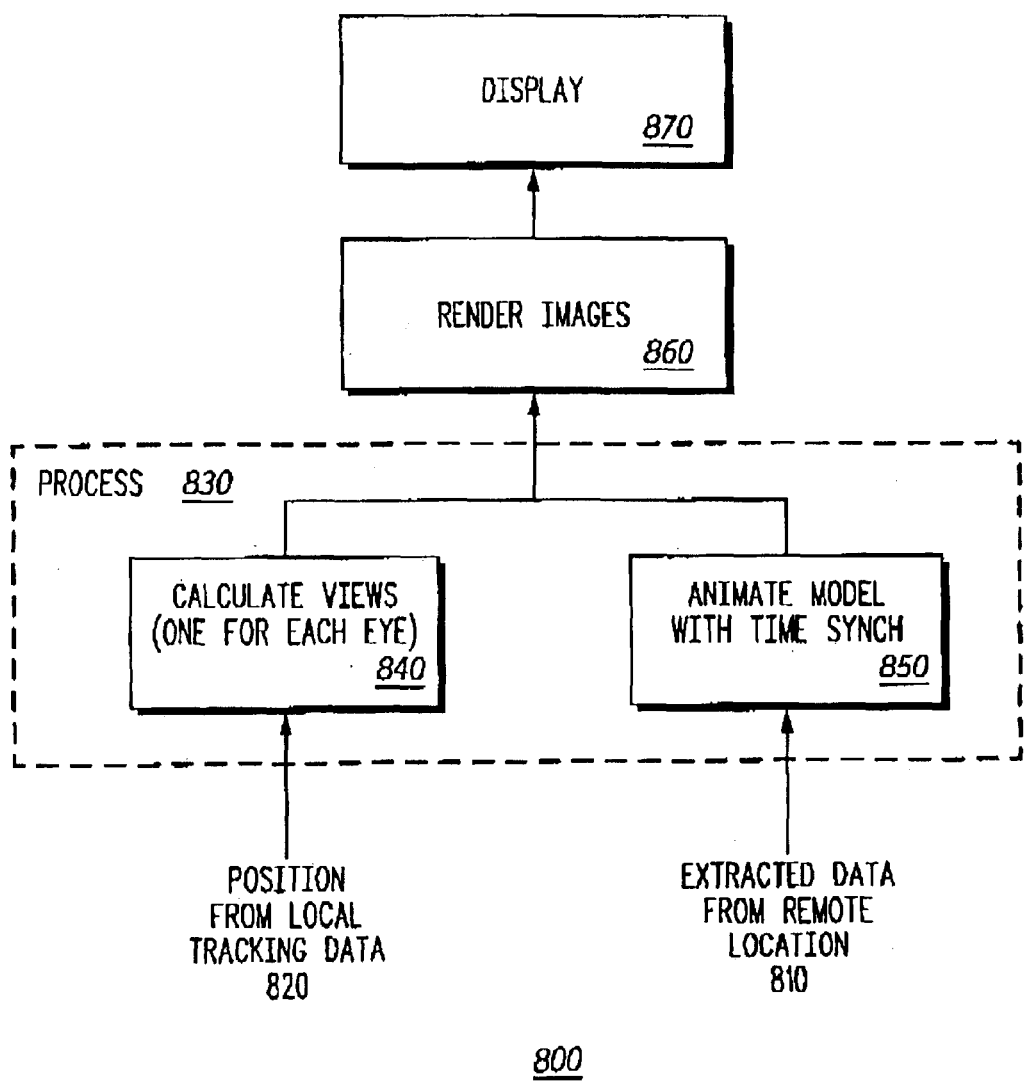
FIG. 8 illustrates an image generation and display flow, in accordance with certain embodiments of the present invention

Referring now to FIG. 6, exemplary data capture system 600 is shown. The capture and tracking elements illustrated in this drawings include first and second eye cameras 610, 620, face camera 630, microphone for capturing sounds made by the participant, and tracking equipment 650. Eye cameras 610 and 620 capture the movement of various eyes features, including pupil movement, blinks, and eyebrow movement. Face camera 630 can capture movement of the mouth, jaw, node, and head orientation. Microphone 640 can additionally be a boom microphone having a camera that looks at the participant's mouth. Tracking equipment 650 tracks these features over time. In FIG. 7, image capture flow 700 illustrates how the data captured by capture elements 610, 620, 630, 650 of image capture block 710 is then processed by vision recognition and feature extraction processing at block 720 to extract certain valuable feature-cued data. At block 730, synchronization of this extracted feature data with a time or date stamp is performed prior to the data being transmitted for receipt by a receive block 455 associated with a remote location. FIG. 8 illustrates image generation and display flow 800, in which it is illustrated that views of the virtual representation by a participant at a remote location may be generated at Block 840, for one each eye for 3D stereoscopic viewing if desired, from local tracking data 820, referred to as perspective data herein. Extracted feature data from the remote location 810 is used to animate the stored model of the remote participant at Block 850. This information is then passed onto a rendering engine that renders computer images, which again may be stereo at Block 860; the rendered images may include audio information as described previously. Finally, at block 870, a display element, such as a display screen or a head mounted display, displays the rendered images to the local participant.

Figure 9:
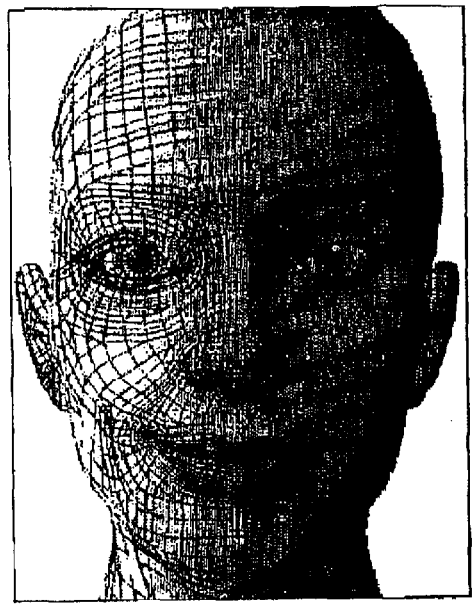
FIG. 9 illustrates an exemplary three-dimensional model, in accordance with certain embodiments of the present invention

Referring now to FIG. 9, an example of a 3D model, as may be stored locally to aid in the generation of an avatar representative of a remote participant, is illustrated. On the left side of the model is the wireframe, the vertices of which are stored in memory and define the geometry of the of the face of the remote participant. On the right side, the texture map of the face, which shows such things as skin texture, eye color, etc., is overlaid the basic geometry of the wireframe as shown to provide a more real and compelling view of the remote participant. The updated movement, reflected in the captured feature data, is manifested in corresponding changes of the wireframe.

Figure 10:
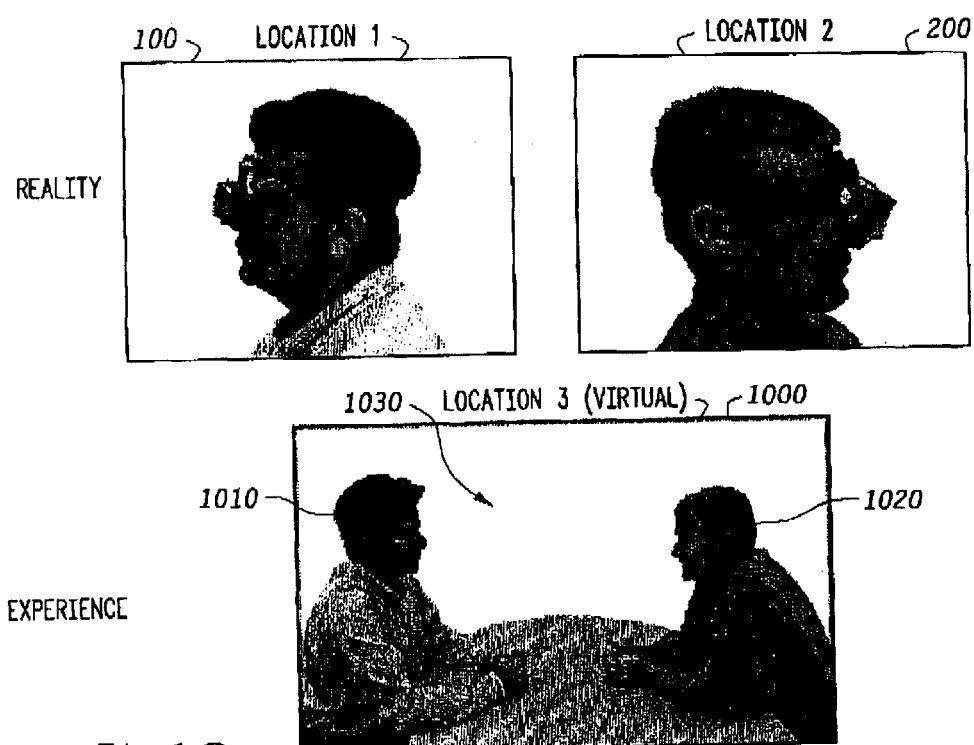
FIG. 10 illustrates a simplified teleconference between first and second participants at a virtual location, in accordance with certain embodiments of the present invention
Figure 11:
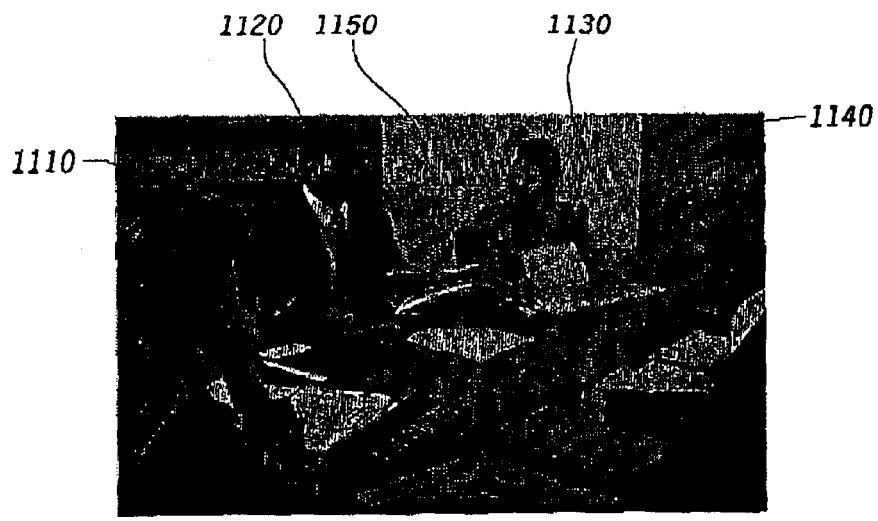
FIG. 11 illustrates a teleconference having multiple participants at a virtual location, in accordance with certain embodiments of the present invention
Figure 12:
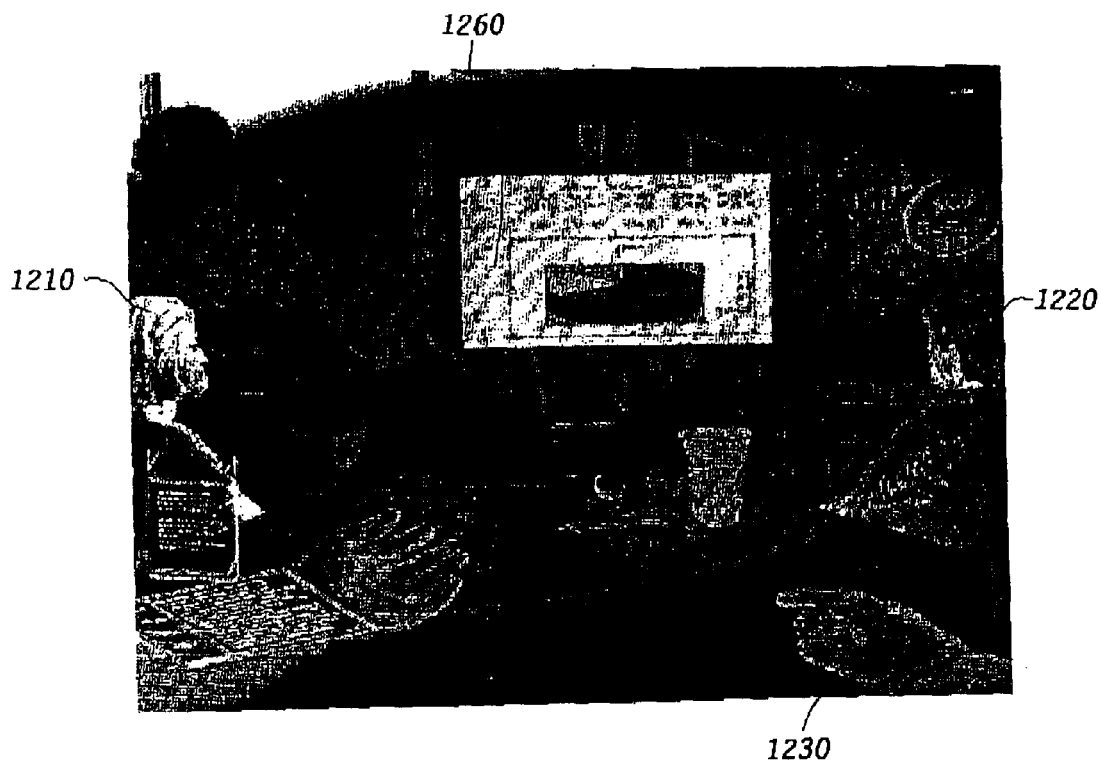
FIG. 12 illustrates a teleconference with shared objects and multiple participants, in accordance with certain embodiments of the present invention.

In FIG. 10, an illustration of a first participant at location 100, a second participant at location 200, and a virtual location 1000 is illustrated. In can be seen that, in this example, participants 1 and 2 at locations 100 and 200, respectively, are wearing head mounted displays through which they may both experience a virtual teleconference 1000 in which participant 1 1010 and participant 2 1020 both experience an mutual environment 1030 that is not real but which does make use of eye-to-eye contact and other telepresence features to greatly facilitate the virtual meeting. In this example, the environment 1030 is streamlined, having a conference table, a chair for each of the participants, and the participants themselves. It is also envisioned that the virtual environment may include the virtual representations of participants set against a real backdrop of the location where they are (location 1, location 2, etc.), such as in the middle of a library or conference room, etc. in which the viewing participant is actually located. As has been discussed, a teleconference according to the present invention is scalable to a number of participants. As shown in virtual teleconference 1100 of FIG. 11, this virtual teleconference 1100 is attended by at least four participants 1110, 1120, 1130, and 1140. The virtual environment 1150 in which the teleconference takes place is more elaborate. Also, as shown in this example and also in FIG. 12, may actually be better for a face-to-face traditional conference because it can facilitate the sharing of data during the teleconference by many participants are varying physical locations. In FIG. 12, participants 1210, 1220, and 1230 share an environment 1250 in which data or other objects presented during the virtual teleconference, such as view graph 1260, may be offered by a participant for viewing by one or more of the other teleconference participants. The ability to share data or other object information residing at a remote location with others not at that location via the virtual teleconference provides the advantage of being able to share a quality and quantity of information that would not ordinarily be available in a traditional teleconference. When there are more than two people in the teleconference, telepresence facilitates the exchange and observation of inter-personal communications that occur between multiple participants, such as shrugs, glances, etc. which commonly form an important, non-verbal aspect of any conversation. If there is a shared object, for instance, a participant can see that other participants in the teleference have their attention directed to the shared object or that a participant is looking away from the object, etc., to reflect the full extent of communications that might occur in an actual meeting.

Telepresence telecommunications is a novel approach designed to provide a sense of presence of the person or persons with whom the communication is taking place. It is an alternative to traditional video conferencing systems that may use three-dimensional graphical avatars and animation enhancements to deliver the experience of a face-to-face conversation. Other communication methods like letter writing, telephone, email or video teleconferencing do not provide the same experience as an in-person meeting. In short, the sense of presence is absent. A telepresence teleconference attempts to deliver the experience of being in physical proximity with the other person or persons or objects with which communication is taking place.

Telepresence architecture employs an audio-visual communication system that is operable to transmit to one or more remote users a local image's likeness in three dimensions, potentially in full scale and in full color. Telepresence communication is also operable to remotely make and maintain eye contact. Mechanisms that contribute to the sense of presence with a remote person are the provision for a high resolution display for one or more specified regions of an image, the ability to track participant movements within one or more specified regions of an image, and the ability to update changes in local and/or remote participant changes in near real-time. The telepresence architecture enables one or more participants to receive likeness information and render the information as a three-dimensional image from the perspective of the local participant to a display unit, providing proper tracking and refresh rates.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of teleconferencing at a virtual location between a first participant at a first location and a second participant at a second location, comprising:
   processing a first plurality of perspective data of a first perspective of an environment of the virtual location experienced by the first participant and a first extract feature data extracted from a first plurality of cued data captured from the second participant to generate a first virtual representation of the second participant in the environment of the virtual location from the perspective of the first participant;
   processing a second plurality of perspective data of a second perspective of an environment of the virtual location experienced by the second participant and a second extract feature data extracted from a second plurality of cued data captured from the first participant to generate a second virtual representation of the first participant in the environment of the virtual location from the perspective of the second participant;
   displaying the first virtual representation of the second participant in the virtual location of the teleconference to the first participant at the first location; and
   displaying the second virtual representation of the first participant in the virtual location of the teleconference to the second participant at the second location.

2. The method of claim 1, wherein displaying the first and second virtual representations further comprises:
   displaying the first virtual representation of the second participant to the first participant on a first head mounted display worn by the first participant; and
   displaying the second virtual representation of the first participant to the second participant on a second head mounted display worn by the second participant.

3. The method of claim 1, further comprising:
   updating the first virtual representation of the second participant upon a change in one or more of the first plurality of perspective data and the first extracted feature data to generate an updated first virtual representation;
   displaying the updated first virtual representation of the second participant in the virtual location of the teleconference to the first participant at the first location;
   updating the second virtual representation of the second participant upon a change in one or more of the second plurality of perspective data and the second extracted feature data to generate an updated second virtual representation; and
   displaying the updated second virtual representation of the first participant in the virtual location of the teleconference to the second participant at the first location.

4. A method of teleconferencing at a virtual location between a first participant at a first location and a second participant at a second location, comprising:
   capturing a first plurality of cued data generated by a plurality of features of the first participant and a first plurality of perspective data of a first perspective of an environment of the virtual location experienced by the first participant;
   capturing a second plurality of cued data generated by a plurality of features of the second participant and a second plurality of perspective data of a second perspective of the environment of the virtual location experienced by the second participant;
   extracting a first extracted feature data of the first participant from the first plurality of cued data;
   extracting a second extracted feature data of the second participant from the second plurality of cued data;
   processing the first plurality of perspective data, the second extracted feature data, and a first environment data of the environment of the virtual location to generate a first virtual representation of the second participant in the environment of the virtual location from the perspective of the first participant;
   processing the second plurality of perspective data, the first extracted feature data, and a second environment data of the environment of the virtual location to generate a second virtual representation of the first participant in the environment of the virtual location from the perspective of the second participant;
   displaying the first virtual representation of the second participant in the virtual location of the teleconference to the first participant at the first location; and
   displaying the second virtual representation of the first participant in the virtual location of the teleconference to the second participant at the second location.

5. The method of claim 4, wherein displaying the first and second virtual representations further comprises:
   displaying the first virtual representation of the second participant to the first participant on a first head mounted display worn by the first participant; and displaying the second virtual representation of the first participant to the second participant on a second head mounted display worn by the second participant.

6. The method of claim 5, wherein capturing the first plurality of cued data and the first plurality of perspective data is performed by a first plurality of capture elements of the first head mounted display and wherein capturing the second plurality of cued data and the second plurality of perspective data is performed by a second plurality of capture elements of the second head mounted display.

7. The method of claim 4, further comprising:

updating the first virtual representation of the second participant upon a change in one or more of the first plurality of perspective data, the second extracted feature data and the first environment data to generate an updated first virtual representation;

displaying the updated first virtual representation of the second participant in the virtual location of the teleconference to the first participant at the first location;

updating the second virtual representation of the first participant upon a change in one or more of the second plurality of perspective data, the first extracted feature data and the second environment data to generate an updated second virtual representation; and displaying the updated second virtual representation of the first participant in the virtual location of the teleconference to the second participant at the first location.

8. The method of claim 7, further comprising:

displaying the updated first virtual representation of the second participant to the first participant on a first head mounted display worn by the first participant; and displaying and the updated second virtual representation of the first participant to the second participant on a second head mounted display worn by the second participant.

9. The method of claim 8, wherein capturing the first plurality of cued data and the first plurality of perspective data is performed by a first plurality of capture elements of the first head mounted display and wherein capturing the second plurality of cued data and the second plurality of perspective data is performed by a second plurality of capture elements of the second head mounted display.

10. The method of claim 4, wherein capturing the first and second plurality of cued data and the first and second plurality of perspective data, respectively, occurs in real time.

11. A system that supports a teleconference at a virtual location between a first participant at a first location and a second participant at a second location, comprising:

a first data processing element that processes a first plurality of cued data captured from a plurality of features of the first participant and extracts selected feature data recognized from the first plurality of cued data to generate first extracted feature data of the first participant;

a first transmit element that transmits the first extracted feature data of the first participant;

a second data processing element that processes a second plurality of cued data captured from a plurality of features of the second participant and extracts selected feature data recognized from the second plurality of cued data to generate second extracted feature data of the second participant;

a second transmit element that transmits the second extracted feature data of the second participant;

wherein the first processing element processes a first plurality of perspective data that relate to a first perspective of the environment of the virtual location experienced by the first participant, the second extracted feature data, and a first environment data of the environment of the virtual location to generate a first virtual representation of the second participant in the environment of the virtual location from the perspective of the first participant;

wherein the second processing element processes a second plurality of perspective data that relate to a second perspective of the environment of the virtual location experienced by the second participant, the first extracted feature data, and a second environment data of the environment of the virtual location to generate a second virtual representation of the first participant in the environment of the virtual location from the perspective of the second participant;

a first display element that displays the first virtual representation to the first participant at the first location; and a second display element that displays the second virtual representation to the second participant at the second location;

wherein the first processing element updates the first virtual representation of the second participant upon a change in one or more of the first plurality of perspective data, the second extracted feature data and the first environment data, and wherein the second processing element updates the second virtual representation of the first participant upon a change in one or more of the second plurality of perspective data, the first extracted feature data and the second environment data.

12. The system of claim 11, wherein the first data processing element, the first transmit element, and the first display element are at the first location and the second data processing element, the second transmit element, and the second display element are at the second location.

13. The system of claim 11, wherein the first and second display elements are first and second head mounted displays worn by the first and second participants, respectively.

14. The system of claim 13, further comprising:

a first plurality of capture elements of the first head mounted display that capture the first plurality of cued data; and a second plurality of capture elements of the second head mounted display that capture the second plurality of cued data.

15. The system of claim 14, wherein the first plurality of capture elements further capture the first plurality of perspective data and the second plurality of capture elements further capture the second plurality of perspective data.

16. The system of claim 11, wherein the first data processing element further comprises a first view generation element that generates first and second views of the first virtual representation of the second participant that are displayed by the first display element to first and second eyes of the first participant; and wherein the second data processing element further comprises a second view generation element that generates first and second views of the second virtual representation of the first participant that are displayed by the second display element to first and second eyes of the second participant.

17. A system that supports a teleconference at a virtual location between a first participant at a first location and a second participant at a second location, comprising:

a first capture element that captures a first plurality of cued data from the first participant that are generated by a plurality of features of the first participant and captures a first plurality of perspective data from the first participant that relate to a first perspective of an environment of the virtual location experienced by the first participant;

a second capture element that captures a second plurality of cued data from the second participant that are generated by a plurality of features of the second participant and captures a second plurality of perspective data from the second participant that relate to a second perspective of the environment of the virtual location experienced by the second participant;

a first processing element that processes the first plurality of cued data and extracts selected feature data recognized from the first plurality of cued data to generate first extracted feature data of the first participant;

a second processing element that processes the second plurality of cued data and extracts selected feature data recognized from the second plurality of cued data to generate second extracted feature data of the second participant;

a first transmit element that transmits the first extracted feature data of the first participant;

a second transmit element that transmits the second extracted feature data of the second participant;

a first receive element that receives the first plurality of perspective data and the second extracted feature data of the second participant transmitted by the second transmit element;

a second receive element that receives the second plurality of perspective data and the first extracted feature data of the first participant transmitted by the first transmit element;

wherein the first processing element processes the first plurality of perspective data, the second extracted feature data, and a first environment data of the environment of the virtual location to generate a first virtual representation of the second participant in the environment of the virtual location from the perspective of the first participant;

wherein the second processing element processes the second plurality of perspective data, the first extracted feature data, and a second environment data of the environment of the virtual location to generate a second virtual representation of the first participant in the environment of the virtual location from the perspective of the second participant;

a first rendering element coupled to the first processing element and the first display element that renders the first virtual representation of the second participant for display by the first display element;

a first display element that displays to the first participant the first virtual representation of the second participant in the environment of the virtual location from the perspective of the first participant;

a second rendering element coupled to the second processing element and the second display element that renders the second virtual representation of the first participant for display by the second display element;

a second display element that displays to the second participant the second virtual representation of the first participant in the environment of the virtual location from the perspective of the second participant;

wherein the first processing element updates the first virtual representation of the second participant upon a change in one or more of the first plurality of perspective data, the second extracted feature data and the first environment data, and wherein the second processing element updates the second virtual representation of the first participant upon a change in one or more of the second plurality of perspective data, the first extracted feature data and the second environment data.

18. The system of claim 17, wherein the first and second capture elements capture the first and second plurality of cued data and the first and second plurality of perspective data, respectively, in real time.

19. The system of claim 17, wherein the first capture element, the first processing element, the first transmit element, and the first receive element are at the first location and the second capture element, the second processing element, the second transmit element, and the second receive element are at the second location.

20. The system of claim 17, wherein the first and second display elements are first and second head mounted displays worn by the first and second participants, respectively.

21. The system of claim 20, further comprising:
a first plurality of capture elements of the first head mounted display that capture the first plurality of cued data; and
a second plurality of capture elements of the second head mounted display that capture the second plurality of cued data.

22. The system of claim 21, wherein the first plurality of capture elements further capture the first plurality of perspective data and the second plurality of capture elements further capture the second plurality of perspective data.

23. The system of claim 17, wherein the first processing element further comprises a first view generation element that generates first and second views of the first virtual representation of the second participant that are rendered by the first rendering element and displayed by the first display element to first and second eyes of the first participant; and
wherein the second processing element further comprises a second view generation element that generates first and second views of the second virtual representation of the first participant that are rendered by the second rendering element and displayed by the second display element to first and second eyes of the second participant.

24. An apparatus that supports a teleconference at a virtual location between a first participant at a first location and a second participant at a second location, comprising:
a receive element that receives a first plurality of perspective data captured from the first participant and relating to a first perspective of an environment of the virtual location experienced by the first participant and a first plurality of cued data captured from the second participant, wherein the first plurality of cued data are generated by a plurality of features of the second participant;
a processing element coupled to the receive element that processes the first plurality of perspective data, the first plurality of cued data and environment data about the environment of the virtual location to generate a virtual representation of the second participant in the environment of the virtual location from the perspective of the first participant;
a rendering element coupled to the processing element that renders the virtual representation of the second participant for display; and a display element that displays the rendered virtual representation wherein the processing element updates the virtual representation of the second participant upon a change in one or more of the first plurality of perspective data, the first plurality of cued data and the environment data.

25. The apparatus of claim 24, wherein the first plurality of cued data of the second participant comprises data cued by one or more of face movement generated by the face, head movement generated by the head and body movement generated by the body of the second participant.

26. The apparatus of claim 25, wherein face movement of the second participant comprises one or more of eye movement, head movement and mouth movement of the second participant and changes the representative image of the second participant rendered and displayed to the first participant.

27. The apparatus of claim 24, wherein the processing element maps the first plurality of cued data to a three-dimensional model of the second participant in accordance with the first plurality of perspective data and the environment data to generate the virtual representation of the second participant.

28. The apparatus of claim 24, wherein the display element is a head mounted display that displays the representation of the second participant to the first participant.

29. The apparatus of claim 24, wherein the virtual representation of the second participant comprises a virtual image component generated by the processing element from the first plurality of cued data of the second participant.

30. The apparatus of claim 29, wherein the virtual representation further comprises a virtual audio component generated by the processing element from one or more of the first plurality of perspective data of the first participant and an audio representation of the environment of the virtual location.

31. The apparatus of claim 30, wherein the first plurality of perspective data from the first participant comprises one or more of head movement of the first participant and a relative position of the first participant in the environment of the virtual location and wherein the virtual audio component is changed by a change in one or more of the head movement of the first participant and the relative position of the first participant in the environment.

32. The apparatus of claim 30, wherein the audio representation comprises one or more of a first audio component as experienced by the first participant in the environment, a second audio component as experienced by the second participant in the environment, and an ambient component of the environment in the virtual location.

33. The apparatus of claim 32, wherein the virtual audio component is changed by a change in one or more of the first audio component as experienced by the first participant in the environment, the second audio component as experienced by the second participant in the environment, and the ambient component of the environment in the virtual location.

34. The apparatus of claim 24, wherein the first plurality of perspective data from the first participant comprises one or more of head movement of the first participant and a relative position of the first participant in the environment of the virtual location.

35. The apparatus of claim 24, wherein the processing element further comprises a view generation element that generates first and second views of the virtual representation of the second participant that are rendered by the rendering element to first and second eyes of the first participant.

36. The apparatus of claim 24, further comprising:
a transmit element coupled to the processing element that transmits a second plurality of visual cue data captured from the first participant, wherein the second plurality of visual cue data are generated by a plurality of features of the first participant.

37. The apparatus of claim 36, wherein the second plurality of cued data of the first participant comprises data cued by one or more of face movement, head movement and body movement of the first participant.

38. The apparatus of claim 37, wherein face movement of the first participant comprises one or more of eye movement, head movement and mouth movement of the first participant.

39. The apparatus of claim 36, wherein the processing element further comprises a vision recognition element operable to recognize and extract the plurality of visual cues generated by the plurality of features of the first participant.

40. The apparatus of claim 39, wherein the vision recognition element is further operable to track the plurality of visual cues generated by the plurality of features of the first participant.

41. The apparatus of claim 36, further comprising a capture element operable to capture the second plurality of visual cue data generated by the plurality of features of the first participant.

42. The apparatus of claim 41, wherein the capture element further comprises:
a first capture subelement that captures movement of a first eye region of the first participant;
a second capture subelement that captures movement of a second eye region of the first participant; and
a third capture subelement that captures movement of a mouth region of the first participant.

43. The apparatus of claim 42, wherein the capture element further comprises:
a fourth capture subelement that captures movement of a head of the first participant.

44. The apparatus of claim 24, wherein the first location is a local location and the second location is a remote location.

45. The apparatus of claim 24, wherein the processing element updates the virtual representation of the second participant upon a change in one or more of the first plurality of perspective data, the first plurality of cued data and the environment data.

46. A method of teleconferencing at a virtual location between a first participant at a first location and a second participant at a second location, comprising:
receiving a first plurality of perspective data captured from the first participant and relating to a first perspective of an environment of the virtual location experienced by the first participant and a first plurality of cued data captured from the second participant and capturing a second plurality of visual cue data generated by a plurality of features of the second participant;
recognizing and extracting the plurality of visual cues generated by the plurality of features of the first participant;
processing the first plurality of perspective data, the first plurality of cued data and environment data about the environment of the virtual location to generate a virtual representation of the second participant in the environment of the virtual location from the perspective of the first participant;
rendering the virtual representation of the second participant for display on a display element;

displaying on the display element the rendered virtual representation; and updating the virtual representation upon a change in one or more of the first plurality of perspective data, the first plurality of cued data and the environment data.

47. The method of claim 46, wherein processing to generate the virtual representation of the second participant in the environment of the virtual location further comprises:

generating a virtual image component of the virtual representation from the first plurality of cued data of the second participant.

48. The method of claim 47, further comprising:

generating a virtual audio component from one or more of the first plurality of perspective data of the first participant and an audio representation of the environment of the virtual location.

49. The method of claim 48, wherein the first plurality of perspective data from the first participant comprises one or more of head movement of the first participant and a relative position of the first participant in the environment of the virtual location and wherein the virtual audio component is changed by a change in one or more of the head movement of the first participant and the relative position of the first participant in the environment.

50. The method of claim 48, wherein the audio representation comprises one or more of a first audio component as experienced by the first participant in the environment, a second audio component as experienced by the second participant in the environment, and an ambient component of the environment in the virtual location.

51. The method of claim 50, further comprising updating the virtual audio component by changing one or more of the first audio component as experienced by the first participant in the environment, the second audio component as experienced by the second participant in the environment, and the ambient component of the environment in the virtual location.

52. The method of claim 46, further comprising:

updating a model of the second participant with the second plurality of visual cue data generated by the plurality of features of the second participant.

53. The method of claim 46, wherein the first plurality of perspective data from the first participant comprises one or more of head movement of the first participant and a relative position of the first participant in the environment of the virtual location.

54. The method of claim 46, wherein processing to generate the virtual representation further comprises:

generating first and second views of the virtual representation of the second participant; and wherein rendering the virtual representation further comprises:

rendering the first and second views of the virtual representation of the second participant for display to first and second eyes of the first participant.

55. The method of claim 46, further comprising:

generating a second plurality of visual cue data from a plurality of features of the first participant; and transmitting a second plurality of visual cue data captured from the first participant, wherein the second plurality of visual cue data are generated by a plurality of features of the first participant.

56. The method of claim 55, wherein the second plurality of cued data of the first participant comprises data cued by one or more of face movement, head movement and body movement of the first participant.

57. The method of claim 56, wherein face movement of the first participant comprises one or more of eye movement, head movement and mouth movement of the first participant.

58. The method of claim 55, further comprising after generating the second plurality of visual cue data:

capturing the second plurality of visual cue data; and recognizing and extracting the plurality of visual cues generated by the plurality of features of the first participant from the captured second plurality of visual cue data.

59. The method of claim 55, further comprising:

tracking the plurality of visual cues generated by the plurality of features of the first participant.

60. The method of claim 46, wherein the first plurality of cued data are generated by a plurality of features of the second participant.

61. The method of claim 60, wherein the first plurality of cued data of the second participant comprises data cued by one or more of face movement generated by the face, head movement generated by the head and body movement generated by the body of the second participant.

62. The method of claim 61, wherein face movement of the second participant comprises one or more of eye movement, head movement and mouth movement of the second participant and changes the representative image of the second participant rendered and displayed to the first participant.

63. The method of claim 46, wherein the second plurality of cued data of the first participant comprises data cued by one or more of face movement, head movement and body movement of the first participant.

64. The method of claim 63, wherein face movement of the first participant comprises one or more of eye movement, head movement and mouth movement of the first participant.

65. The method of claim 46, wherein capturing the second plurality of visual cue data further comprises:

a first capture subelement capturing movement of a first eye region of the first participant;

a second capture subelement capturing movement of a second eye region of the first participant; and a third capture subelement capturing movement of a mouth region of the first participant.

66. The method of claim 65, further comprising:

a fourth capture subelement capturing movement of a head of the first participant.

67. The method of claim 46, further comprising tracking the plurality of visual cues generated by the plurality of features of the first participant.

68. The method of claim 46, further comprising processing a three-dimensional model of the second participant and mapping the virtual representation of the second participant onto the three-dimensional model of the second participant.

69. The method of claim 46, wherein the first location is a local location and the second location is a remote location.

* * * * *